United States Patent [19]

Schick et al.

[11] Patent Number: 5,783,514
[45] Date of Patent: Jul. 21, 1998

[54] SHELL CATALYST, A PROCESS FOR ITS PRODUCTION AND ITS USE

[75] Inventors: Klaus-Peter Schick; Franz-Josef Carduck, both of Haan; Gerd Goebel, Cologne; Hans-Georg Rollberg, Duesseldorf, all of Germany

[73] Assignee: Henkel Kommanditgesellschaft auf Aktien, Duesseldorf, Germany

[21] Appl. No.: 307,759

[22] PCT Filed: Mar. 18, 1993

[86] PCT No.: PCT/EP93/00643

§ 371 Date: Sep. 26, 1994

§ 102(e) Date: Sep. 26, 1994

[87] PCT Pub. No.: WO93/18856

PCT Pub. Date: Sep. 30, 1993

[30] Foreign Application Priority Data

Mar. 26, 1992 [DE] Germany ............... 42 09 832.7

[51] Int. Cl.⁶ .............................................. B01J 21/18
[52] U.S. Cl. .................................. 502/185; 502/182
[58] Field of Search ........................ 502/185, 182

[56] References Cited

U.S. PATENT DOCUMENTS

| 2,749,359 | 6/1956 | Calkins et al. | 260/465.8 |
| 3,138,560 | 6/1964 | Keith et al. | 252/447 |
| 3,736,266 | 5/1973 | Schrage | 252/447 |

FOREIGN PATENT DOCUMENTS

| 1157844 | 11/1983 | Canada . |
| 2530759 | 6/1976 | Germany . |
| 2705340 | 3/1978 | Germany . |
| 2850510 | 6/1980 | Germany . |
| 61-114743 | 6/1986 | Japan . |
| 0799871 | 8/1958 | United Kingdom . |

*Primary Examiner*—Michael Lewis
*Assistant Examiner*—Thomas G. Dunn, Jr.
*Attorney, Agent, or Firm*—Ernest G. Szoke; Wayne C. Jaeschke; Daniel S. Ortiz

[57] ABSTRACT

The invention is an improved palladium-containing catalyst and process for preparing the catalyst. The catalyst is prepared by impregnating a dry activated carbon with a pH above 8 with a solution of palladium salt, separating the aqueous phase from the impregnated activated carbon when the aqueous phase has reached a pH of at least 1 and reducing the palladium which is supported on the activated carbon.

5 Claims, 3 Drawing Sheets

SHELL CATALYST, A PROCESS FOR ITS PRODUCTION AND ITS USE

FIELD OF THE INVENTION

This invention relates to a shell catalyst containing 0.3 to 5% by weight and, more particularly, 0.5 to 2% by weight of palladium on an active carbon support, based on the dried catalyst, obtainable by impregnation of the support with an aqueous palladium salt solution, precipitation of palladium and reduction (activation).

BACKGROUND OF THE INVENTION

The hardening of unsaturated fats, oils and fatty acids on an industrial scale by hydrogenation is carried out with nickel catalysts in the form of fine powders in intensively stirred autoclaves under hydrogen pressures of up to 20 bar and at temperatures of up to 250° C. Particular problems arise above all in the hydrogenation of fatty acids. On the one hand, nickel soaps are formed at the temperatures mentioned and can only be removed from the product by distillation. In addition, the activity and life of the catalyst are reduced through the dissolving out of nickel from the catalyst. On the other hand, separation of the catalyst from the product is complicated and leads to increased losses of product.

These disadvantages can be avoided by using palladium catalysts. Palladium is acid-resistant. Accordingly, no soaps requiring separation are formed. The life of such a catalyst is thus so long that economically justifiable continuous hydrogenation in a fixed catalyst bed is possible. Accordingly, there is no longer any need for the complicated separation of the catalyst from the product.

In addition, palladium catalysts are eminently suitable for the hydrogenation of edible fats because the hydrogenated product contains no residual nickel at all.

RELATED ART

A catalyst of the type mentioned at the beginning is known from CA-B-1,157,844. As described in detail in this document with references from the patent literature, the production of a supported noble-metal catalyst generally consists of the three steps of impregnation, precipitation and reduction. For example, this document cites GB-B-799,871 in which a support material is impregnated with $PdCl_2$ solution and is precipitated with $NaHCO_3$ as $Pd(OH)_2$.

Similar processes are described in U.S. Pat. No. 2,749,359, U.S. Pat. No. 3,736,266 and DE 28 50 510.

According to CA-B-1,157,844, the activity of the palladium catalyst is increased by first charging a catalyst support of extruded active carbon with water or an organic liquid before it is impregnated with the palladium salt solution. In this way, the noble metal is only applied to the support in an outer shell. After an impregnation time of 1 hour, the pH value is adjusted to around 4.0 by addition of sodium hydroxide solution so that palladium precipitates as hydroxide. The production of the catalyst is completed by filtration, washing, drying and reduction.

The problem addressed by the present invention was to provide a catalyst of the type mentioned at the beginning which would combine considerably higher activity with a longer life. In addition, the invention set out to provide a simpler and more economical process for the production of such a catalyst.

BRIEF SUMMARY OF THE INVENTION

According to the invention, the solution to this problem is characterized in that active carbon showing an alkaline reaction, more particularly with a pH value of at least 8, is impregnated with the palladium salt solution and the supernatant liquid is separated off after it has reached a pH value of at least 1, more particularly at least 3 and preferably at least 4.

It has surprisingly been found that particularly active catalysts with a very long life are obtained if the basicity present in the carbon is sufficient to increase the pH value of the noble metal salt solution after impregnation to a minimum level which is sufficient for precipitation. In this case, all the palladium contained in the solution is precipitated in a peripheral zone of the support. The supernatant solution is palladium-free, so that there is no need to add an alkali, for example sodium hydroxide, to complete the precipitation process. A shell-type impregnation is obtained, the concentration of noble metal falling to almost zero in an approximately 0.2 mm peripheral zone, as shown by physical surface analysis.

DETAILED DESCRIPTION OF THE INVENTION

Alkali metal tetrahalopalladates, for example, may be used as the palladium salt, although palladium chloride, palladium nitrate and other palladium salts are also suitable.

The iodine values obtainable where hydrogenation is carried out with the catalyst according to the invention are distinctly lower than those obtained where the catalyst described in CA-B-1,157,844 is used for comparable hydrogenation conditions. Thus, according to Example 10 of this document, an iodine value of only 1.7 is reached for a liquid throughput per catalyst volume and time (LHSV) of only 0.2 l/h (2.5 l of catalyst and 0.625 l/h throughput of palm kernel oil) and a pressure of 25 bar. By contrast, palm kernel oil can be hydrogenated to iodine values below 0.6 with the catalyst according to the invention for an LHSV of around l/h.

Whereas the catalyst described in CA-B-1,157,844 in the test with distilled tallow fatty acid - only reaches iodine values below 1 for a very low liquid throughput of 0.2 l/h, the iodine value rising to 2.5–3.3 when the load is increased to only 0.6 l/h, it is possible with the catalyst according to the invention to reach an iodine value below 0.5 for loads of 1/h and an iodine value still well below 1 for loads for 2 to 3/h (Example 5).

According to CA-B-1,157,844, the specific palladium consumption is 0.00089%. The corresponding value from Example 5 after 2,429 kg of fatty acids have been hydrogenated with 1 l of catalyst—still with no significant reduction in activity—is 0.00041% and is thus 50% below the comparison value.

The catalyst according to the invention can be produced particularly simply and economically if the volume of the salt solution is substantially equal to the total pore volume of the active carbon. The active carbon support can then be impregnated by spraying with the solution.

According to the invention, there is no need for the catalyst to be precharged with liquid before impregnation. Accordingly, the active carbon is preferably contacted with the salt solution in dry form. In spite of this, an excellent shell impregnation of the noble metal is obtained in this way, as described in Example 2.

In another embodiment of the invention, the active carbon is agitated during addition of the solution.

In addition, to obtain a low-halide catalyst, the product obtained should be filtered off and washed with water after impregnation with palladium halide salts.

The present invention also relates to a process for the production of this catalyst and to a process for the hardening of fats, oils, fatty acid esters, other fatty acid derivatives and, in particular, free fatty acids by catalytic hydrogenation with hydrogen. The hydrogenation is preferably carried out at temperatures of 80° C. to 250° C. under absolute pressures of 0.5 to 50 bar. The hydrogenation may optionally be carried out in such a way that the iodine value after the reaction is as low as possible, as is generally necessary in the hydrogenation of fatty acids for industrial applications, but which can also be desirable in the hydrogenation of methyl esters (Example 8, 18) or neutral oils (Example 15). These reactions are generally carried out under a hydrogen pressure of 20 bar. However, it is also possible selectively to hydrogenate starting materials with high iodine values under defined conditions to certain iodine values in order to establish certain performance properties. In this case, parameters (temperature, pressure) differing from the normal conditions have to be established. This so-called partial hardening is described in Example 12 for the hardening of rapeseed oil fatty acid and in Example 16 for the hardening of sunflower oil and rape seed oil.

In another embodiment of the invention intended in particular for the hardening of fatty acids, distilled fatty acids are used because their color is so greatly improved during hardening that the color required for marketable products is achieved without any need for the otherwise usual aftertreatment by adsorption.

The invention is illustrated by the following Examples and test results in conjunction with the accompanying drawings, wherein:

EXAMPLES

Example 1
Production of the catalyst 2 ml of HCl (conc.) and 2.21 g of NaCl were added to and stirred with a suspension of 3.342 g of $PdCl_2$ in 160 ml of water until a clear solution was formed. The solution thus formed was added while shaking at room temperature to 100 g of active carbon (Cecarbon GAC 30, sieve fraction larger than 1.4 mm) in a 500 ml flask. The active carbon had a BET surface of 1,140 $m^2/g$, a pore volume of 0.32 ml/g, as measured by Hg porosimetry, a pH value of 8.3 (10% in water) and a residue on ignition of 13.4%. The solution was spontaneously decolored and the pH value of the supernatant solution rose from below 1 to around 3. The mixture was left standing for 1 h, the pH value rising to 4–5. The supernatant solution was then filtered off and washed substantially free from chloride with 2 l of water. The catalyst was dried first by suction and then overnight at 120° C. Yield: 96.2 g (dry).

Example 2
Production of the catalyst 1,680 g of a solution of $Na_2PdCl_4$ (Pd content 20 g) were added at room temperature to 1,000 g of the same active carbon granules as in Example 1 (Cecarbon GAC 30) in a plowshare mixer with the mixer running. After standing for a short time, the granules were rinsed with a little water from the mixer and then left to react for 1 hour in a glass beaker. The catalyst was washed twice with 10 l of water until it was substantially free from chloride and then dried first by suction and then at 120° C. Yield: 1,051.5 g.

Figure 1:
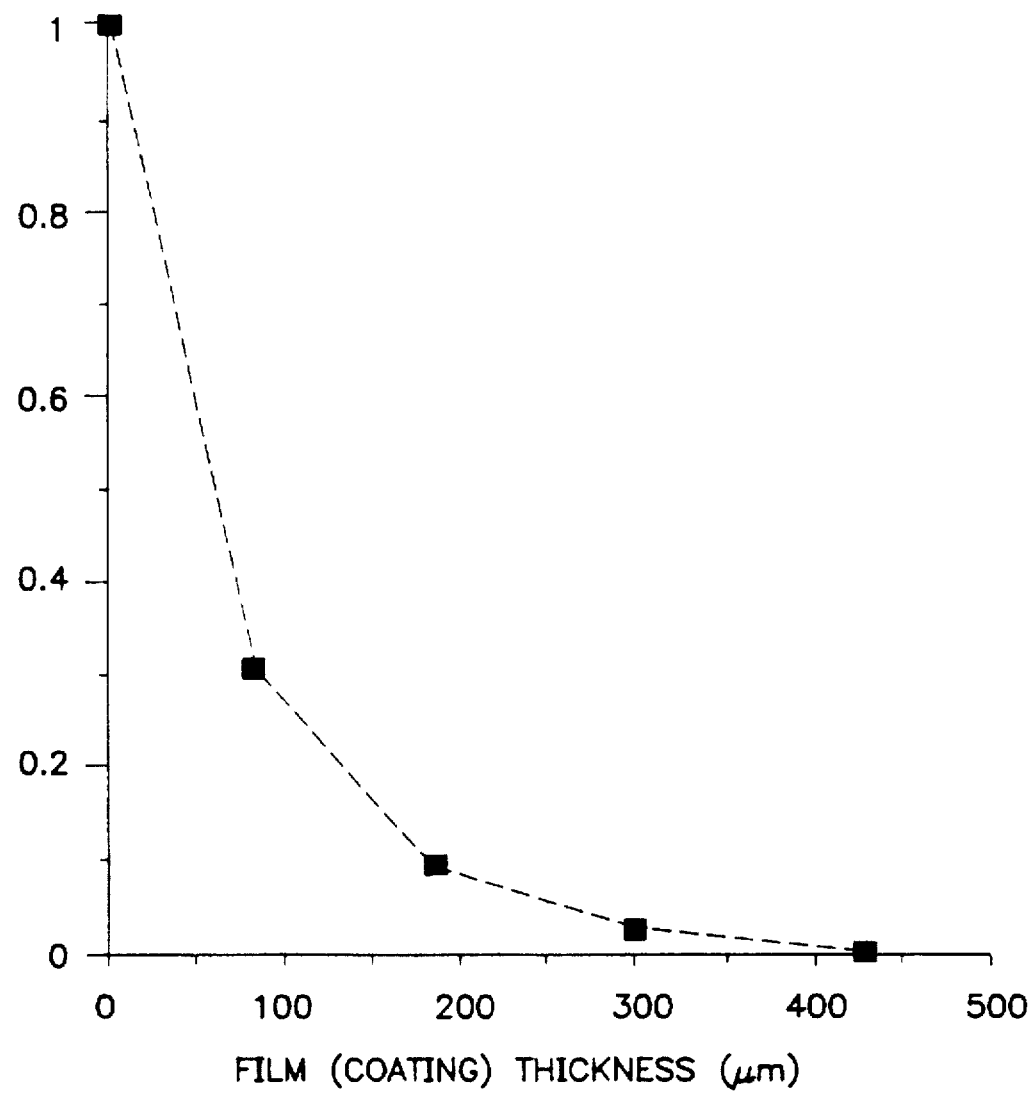
FIG. 1 shows the distribution of palladium over the layer thickness of a catalyst according to the invention.

Noble metal distribution:

The distribution of palladium in a particle of the catalyst according to Example 2 was determined by energydispersive X-ray microanalysis. The results are shown in FIG. 1. The concentration of palladium at the surface of the particle was arbitrarily set at 1 and the concentration inside the catalyst particle was determined in relation to that value. It can clearly be seen that the concentration of palladium has fallen to 10% at a distance of only 200 μm from the surface.

Example 3
Production of the catalyst

In a paddle mixer with a total volume of around 20 l, 3,595 g of Pd solution ($Na_2PdCl_4$, 100 g Pd) and 1,400 g of distilled water were run at room temperature into 5,000 g of active carbon granules (Cecarbon GAC 30, sieve fraction 1.2 to 3.0 mm) with the mixer running. The mixer was then stopped and its contents were drained off and rinsed with 2 liters of distilled water. 1 Liter of water was then added so that the carbon was covered with liquid. After 1 hour, the whole was filtered under suction through a filter nutsch. 6.5 l of filtrate with a pH value of 4.5 were obtained. The filtrate was then washed five times with 10 l of water so that it only contained small quantities of chloride ions. The catalyst was dried at 120° C. Another two batches were produced in the same way so that a total of 15 kg of catalyst with an overall volume of around 30 l was available.

Activation:

For activation before use, all the catalysts produced in the Examples were reduced. To this end, they were heated for 4 h to 200° C. in a stream of nitrogen of 1 $Nm^3/h$. 50 Nl/h of hydrogen were then added to the nitrogen over a period of 20 h at 200° C. The temperature was then maintained for 2 h in an atmosphere of pure hydrogen before the catalyst was used for hydrogenation.

Example 4
Use of the catalyst of Example 1.

The catalyst produced in accordance with Example 1 was tested in a laboratory hydrogenation reactor. A shaft reactor with a catalyst volume of 150 ml (catalyst filling 66.6 g) was charged with liquid and gaseous phase in co-current flow. All the tests were carried out under a hydrogen pressure of 20 bar. Distilled and crude tallow fatty acid were used as raw materials for hardening. The throughput, LHSV and temperature T were varied within wide limits. Individual results are set out in Table 1. It can clearly be seen that the catalyst is highly active even at low temperatures (150° C., LHSV=1, iodine value IV=0.46) and is capable of withstanding very high loads at high temperatures (200° C., LHSV=3.2, IV=0.75). Under all conditions, the catalyst is highly selective, i.e. there are no unwanted secondary reactions which would be reflected in a reduction in the acid value AV.

TABLE 1

Hydrogenation results

|  | T/°C. (°C.) | LHSV (l/h) | IV | AV | Conversion (%) |
|---|---|---|---|---|---|
| Distilled tallow | 200 | 1.07 | 0.11 | 202.3 | 99.8 |
| fatty acid | 200 | 1.00 | 0.13 | 203.3 | 99.8 |
| Iodine value 54.2 | 200 | 2.00 | 0.22 | 204.0 | 99.6 |
|  | 200 | 2.13 | 0.25 | 203.6 | 99.5 |
|  | 201 | 3.20 | 0.75 | 203.6 | 98.6 |
|  | 171 | 3.13 | 1.33 | 204.4 | 97.5 |
|  | 170 | 2.00 | 0.59 | 203.5 | 98.9 |
|  | 171 | 2.00 | 0.75 | 204.4 | 98.6 |
|  | 170 | 1.00 | 0.28 | 204.7 | 99.5 |
|  | 170 | 0.93 | 0.29 | 204.7 | 99.5 |
|  | 151 | 1.00 | 0.46 | 204.2 | 99.2 |
|  | 150 | 2.07 | 3.18 | 204.3 | 94.1 |
| Crude tallow | 171 | 1.07 | 5.34 | 185.9 | 90.4 |
| fatty acid | 170 | 1.00 | 5.21 | 186.1 | 90.6 |
| Iodine value 55.4 | 200 | 1.00 | 2.26 | 186.9 | 95.3 |
|  | 200 | 0.93 | 2.05 | 189.3 | 96.3 |
|  | 220 | 0.93 | 0.90 | 190.3 | 98.4 |

Example 5
Use of the catalyst of Example 2

Figure 2:
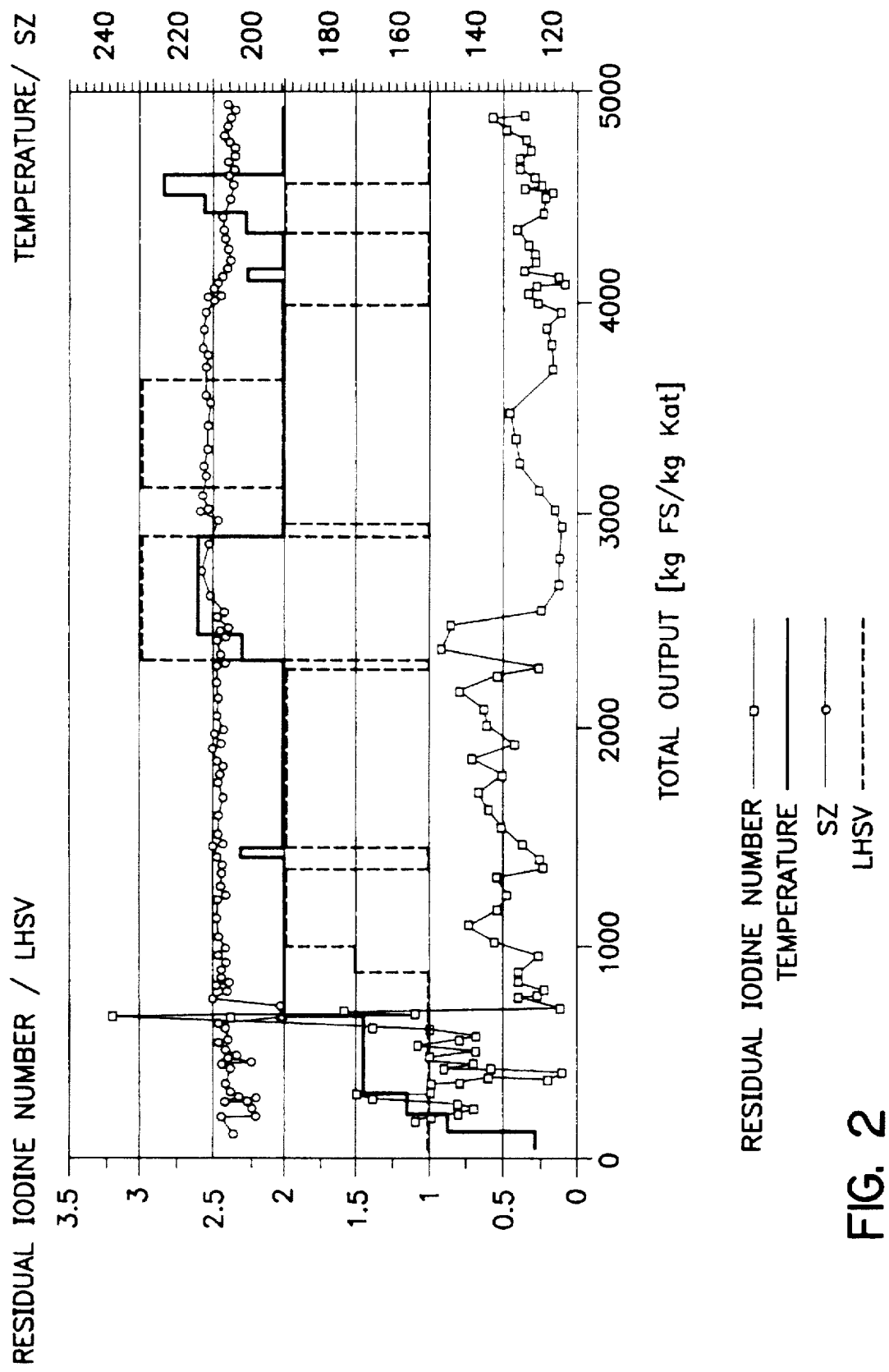
FIG. 2 shows the results of a long-term test in the form of a graph in which the residual iodine value, the liquid load (LHSV), the temperature and the acid value are plotted against the overall throughput.

The catalyst produced in accordance with Example 2 was subjected to a long-term test. To this end, 500 g (1 liter) of the catalyst were tested for 116 days under hydrogenating conditions (hydrogen pressure 20 bar) in a pilot plant with various fatty acids, mainly distilled tallow fatty acid. The throughput and temperature were varied within wide limits. It was found that, even after this long period and a quantity of raw material corresponding to 4,858 kg of product/kg of catalyst, there was still no significant reduction in the activity of the catalyst (IV below 0.5 for LHSV=1 and a temperature of 190° C.). Results covering the entire test period are shown in the form of a graph in FIG. 2. The iodine value and LHSV and the temperature and acid values can be read off from the same scales. The increase in the iodine value on the left of the graph is attributable to the use of crude fatty acid.

Example 6
Use of the catalyst of Example 3.

Figure 3:
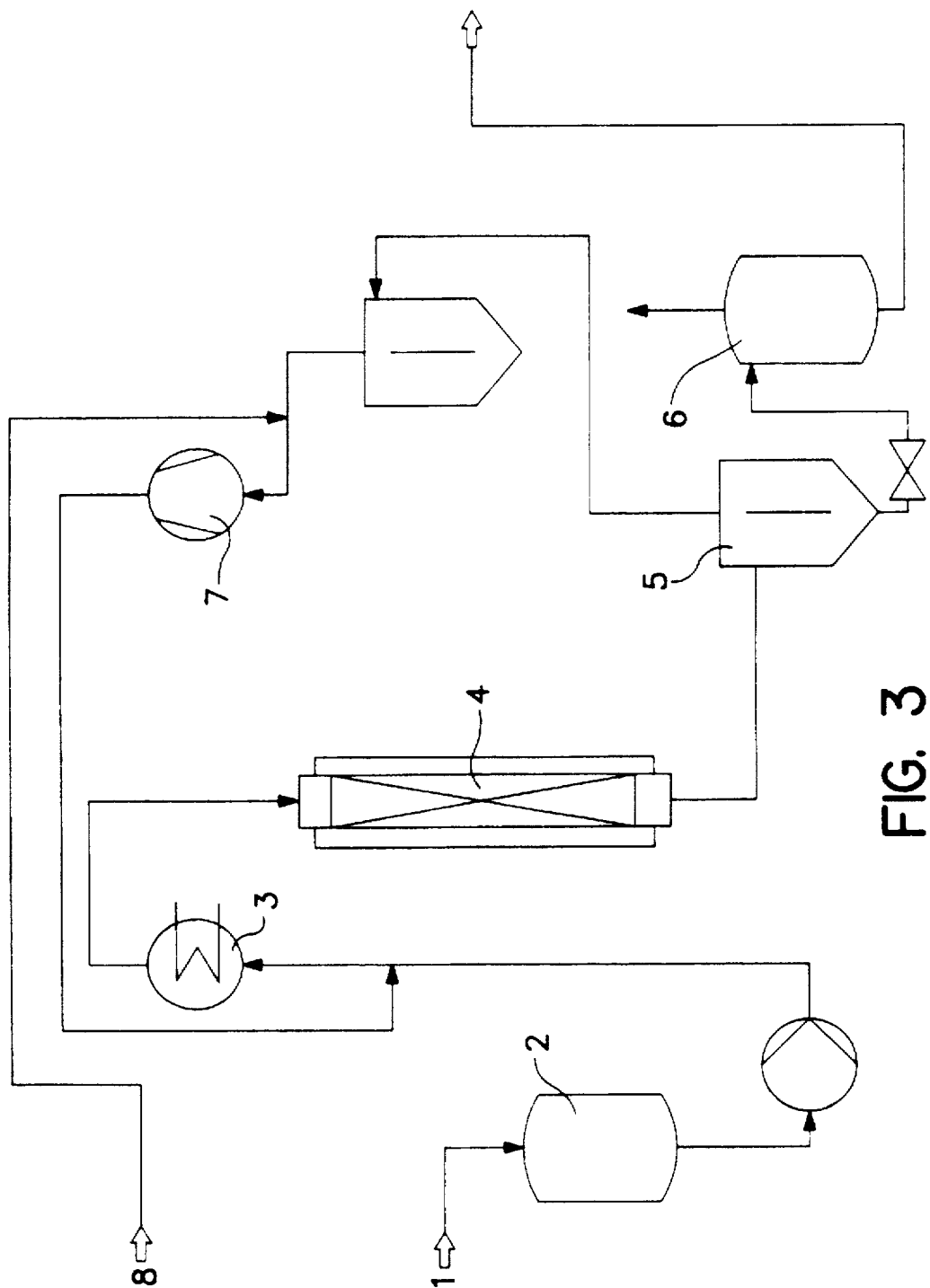
FIG. 3 is a flow chart of a pilot plant for the continuous hydrogenation of fatty acids.

Hydrogenation tests were carried out on a semi-industrial scale with 13.2 kg of the catalyst produced in accordance with Example 3. The plant was a recycle gas plant in which the hydrogen used in excess is separated from the product and recirculated (FIG. 3).

Fatty acid 1 is pumped together with the recycle gas into a reactor 4 via a receiver 2 and a heater 3. The hydrogenated product separated in the high-pressure separator 5 collects in a receiver 6. From the recycle gas compressor 7, the excess hydrogen and also fresh hydrogen 8 are returned to the heater 3.

The test parameters are set out in Table 2.

TABLE 2

Test parameters

| | |
|---|---|
| Reactor type: | single tube |
| Diameter: | 63 mm |
| Length of catalyst bed: | 8,000 mm |
| Volume of catalyst bed: | 25 l |
| L/D: | 127:1 |
| Pressure: | 20 bar |
| Recycle gas volume: | 1.4–1.8 $Nm^3$/l cat · h |
| Throughput: | 1 $m^3/m^3$ cat · h |
| Liquid load: | 8 $m^3/m^3$ · h |
| Gas load (190° C.): | 950–1220 $m^3/m^2$ · h |

Various fatty acid qualities were tested, particularly in regard to the color of the products. The average values of the results obtained for the individual products are set out in Tables 3 and 4. It can be seen in particular from Table 4 that the color of the products is distinctly improved by the hydrogenation step.

TABLE 3

|  | Material | Iodine value before hydr. | IV after hydr. | AV after hydr. | Saponification value SV after hydr. | Unsaponifiables (UV) after hydr. | Unsaponifiables (UV) before hydrogenation |
|---|---|---|---|---|---|---|---|
| 1 | Tallow fatty acid | 58.1 | 0.6 | 205.2 | 205.3 | 0.6% | — |
| 2 | Tallow fatty acid | 58.0 | 0.4 | 205.1 | 205.2 | 0.4% | 0.5% |
| 3 | Tallow fatty acid | 61.3 | 0.2 | 204.8 | 205.1 | 0.3% | 0.4% |
| 4 | Tallow fatty acid | 58.7 | 0.3 | 205.1 | 205.4 |  |  |
| 5 | Separated stearin (from tallow fatty acid) | 13.2 | 0.2 | 208.4 | 208.5 | 0.5% | 0.4% |
| 6 | Separated stearin (from tallow fatty acid) | 22.2 | 0.4 | 208.7 | 209.1 | 0.5 | — |
| 7 | Separated stearin (from tallow fatty acid) | 21.8 | 0.3 | 209.1 | 209.2 | 0.5 | — |
| 8 | Separated stearin (from tallow fatty acid) | 21.3 | 0.2 | 208.5 | 208.9 |  |  |
| 9 | Separated stearin (from tallow fatty acid) | 20.2 | 0.2 | 208.5 |  |  |  |
| 10 | Tallow fatty acid | 59.8 | 0.2 | 203.8 |  |  |  |
| 11 | Separated stearin (containing oleic acid) | 18.5 | 0.1 | 209.1 |  |  |  |

TABLE 4

| | Color characteristics (Lovibond 5¼") | |
|---|---|---|
| Material | Before hydrogenation (yellow value/ red value) | After hydrogenation (yellow value/ red value) |
| 1 Tallow fatty acid | | 1.7/0.7 |
| 2 Tallow fatty acid | 13.0/2.0 | 1.6/0.6 |
| 3 Tallow fatty acid | 3.5/0.8 | 0.5/0.3 |
| 4 Tallow fatty acid | 2.4/0.6 | 0.1/0.1 |
| 5 Separated stearin (from tallow fatty acid) | 2.0/0.5 | 0.6/0.4 |
| 6 Separated stearin (from tallow fatty acid) | 7.7/1.4 | 2.8/1.0 |
| 7 Separated stearin (from tallow fatty acid) | 2.9/0.6 | 1.6/0.7 |
| 8 Separated stearin (from tallow fatty acid) | 7.7/1.5 | 1.8/0.8 |
| 9 Separated stearin (from tallow fatty acid) | 5.7/1.3 | 1.9/0.9 |
| 10 Tallow fatty acid | 2.4/0.5 | 0.7/0.3 |
| 11 Separated stearin (containing oleic acid) | 1.7/0.4 | 0.8/0.5 |

Example 7
Production of the catalyst 716.2 g of extruded active carbon (Carbotech A35/2, 2 mm extrudate, BET surface 890 m²/g, Hg pore volume 0.74 ml/g, pH value 8.7 (10% in $H_2O$) were mixed at room temperature with 514.7 g of Pd salt solution (14.32 g of Pd as $Na_2PdCl_4$) and 200 g of $H_2O$. Another 1,000 g of water were then added. After 1 hour, the mixture was filtered off under suction through a filter nutsch and washed with 17 l of water until substantially free from chloride. The catalyst was dried overnight at 120° C. Yield: 717.5 g.

Example 8
Use of the catalyst of Example 7

355 g (corresponding to 1 l) of the catalyst of Example 7 were activity-tested for 18 days in a hydrogenation reactor using various raw materials. After activation in the usual way (as described above), the catalyst was charged with 171 l of tallow ethyl ester (Me-Ti; IV =50.2; AV=0.80; SV=199.5) and 218 l of tallow fatty acid (Ti-FA; IV=58.5; AV=206.3). The following hydrogenation results were obtained:

| Raw material | Total throughput (l) | Temperature heating circuit (°C.) | LHSV (l/h) | IV |
|---|---|---|---|---|
| Me—Ti | 38 | 170 | 1 | 0.07 |
| | 86 | 170 | 1 | 0.06 |
| | 110 | 180 | 2 | 0.11 |
| | 123 | 180 | 2 | 0.11 |
| Ti-FA | 197 | 190 | 1 | 0.26 |
| | 256 | 190 | 1 | 0.21 |
| | 357 | 200 | 1 | 0.20 |
| | 389 | 200 | 1 | 0.22 |

Example 9
Production of the catalyst 1,000 g of CECARBON GAC 616G active carbon granules with a particles size of 1.2 to 3.4 mm and an apparent density of 0.51 kg/l (pH value 7.8; BET surface 1,190 m²/g and Hg pore volume 0.15 ml/g) were introduced into a mixing vessel.

718.9 g of a solution of $Na_2PdCl_4$ (corresponding to 20.0 g of palladium) were combined with 281 g of $H_2O$ and added as described to the carbon support. The mixture was then diluted with 667 g of $H_2O$ to establish the same liquid ratios. After 1 hour, the catalyst was filtered in the usual way and washed until substantially free from chloride.

The pH value of the first filtrate was 3.5. After the washing step, the washing water had a pH value of 5.5. The moist granules were dried at 120° C.

Example 10
Use of the catalyst of Example 9

520 g (corresponding to 1,000 ml) of the catalyst produced in accordance with Example 9 were tested for 36 days in a 1.2 liter hydrogenation reactor with a total of 660 l of raw materials of various kinds (edible beef tallow: IV=46.6; AV=2.70; SV=195; bone fatty acid: IV=60.6; AV=205.7; tallow fatty acid: IV=58.5, SV 206.3; tallow methyl ester: IV=48.9, AV=0.40, SV=195).

The following hydrogenation results were obtained:

| Raw material | Total throughput (l) | Temperature (°C.) | LHSV (l/h) | IV |
|---|---|---|---|---|
| Beef tallow | 17 | 160 | 1 | 4.0 |
| | 33 | 200 | 1 | 1.1 |
| | 65 | 220 | 1 | 0.57 |
| | 106 | 220 | 0.5 | 0.13 |
| | 154 | 200 | 0.5 | 0.26 |
| | 173 | 200 | 0.5 | 0.42 |
| Bone fatty acid | 189 | 200 | 1 | 0.07 |
| | 222 | 200 | 1 | 0.10 |
| Tallow fatty acid | 278 | 200 | 1 | 0.31 |
| Tallow methyl ester | 394 | 200 | 1 | 0.10 |
| Tallow fatty acid | 512 | 200 | 1 | 0.29 |
| Tallow methyl ester | 532 | 200 | 1 | 0.07 |
| | 660 | 190 | 1 | 0.12 |

Example 11
Production of the catalyst (1% Pd/C)

1,500 g of CECARBON GAC 30 active carbon granules with a particle size of 1.3 to 3 mm and an apparent density of 0.49 kg/l (pH value 8.3 (10% in $H_2O$) ; BET surface 1,140 m²/g and Hg pore volume 0.32 ml/g) were introduced into a mixing vessel, after which a solution of 539.2 g of $Na_2PdCl_4$ (corresponding to 15.0 g of palladium) in 961 g of $H_2O$, i.e. 1,500 g of solution, was rapidly added with stirring. Another 1,000 g of $H_2O$ were then added to obtain a supernatant liquid phase. After standing for 1 hour, the impregnated supported catalyst was filtered off from the salt solution. The catalyst was then washed with 30 l of water until substantially free from chloride, dried at 120° C. and used for hydrogenation tests.

Example 12
Use of the catalyst of Example 11

495 g corresponding to 1,000 ml of the catalyst produced in accordance with Example 11 were tested in a hydrogenation reactor for 51 days with a total of 1,500 l of various raw materials:

| Separated stearin | IV = 18.4 | AV = 209.0 |
|---|---|---|
| Tallow fatty acid | IV = 57.4 | AV = 205.7 |
| Bone fatty acid | IV = 60.6 | AV = 205.7 |
| Rapeseed oil fatty acid | IV = 115.8 | AV = 200.9 |

The rapeseed oil fatty acid was hydrogenated at various temperatures and pressures to establish specific iodine values. The other raw materials were hydrogenated in the usual way at a constant hydrogen pressure of 20 bar.

The following hydrogenation results were obtained:

| Raw material | Total throughput (l) | T (°C.) | P (bar) | LHSV (l/h) | IV |
|---|---|---|---|---|---|
| Separated stearin | 7 | 160 | 20.7 | 1 | 0.03 |
| | 49 | 160 | 20.8 | 2 | 0.67 |
| Tallow fatty acid | 78 | 160 | 19.8 | 1 | 0.36 |
| | 123 | 180 | 20.0 | 1 | 0.46 |
| | 194 | 200 | 21.2 | 1 | 0.39 |
| | 276 | 200 | 19.9 | 1 | 0.17 |
| Bone fatty acid | 434 | 210 | 20.1 | 2 | 0.19 |
| | 706 | 210 | 20.1 | 2 | 0.17 |
| | 892 | 210 | 20.4 | 2 | 0.20 |
| Rapeseed oil fatty acid | 938 | 80 | 20.4 | 2 | 83.6 |
| | 967 | 80 | 10.4 | 1 | 82.8 |
| | 991 | 90 | 5.6 | 1 | 81.1 |
| | 1087 | 90 | 5.5 | 1 | 82.0 |
| | 1111 | 100 | 4.8 | 1 | 67.5 |
| | 1135 | 105 | 5.3 | 1 | 57.9 |
| | 1159 | 110 | 5.3 | 1 | 49.6 |
| | 1183 | 110 | 5.2 | 1 | 49.5 |
| Bone fatty acid | 1253 | 210 | 20.4 | 2 | 0.50 |
| | 1377 | 210 | 20.0 | 1 | 0.18 |
| | 1409 | 210 | 20.3 | 1 | 0.09 |
| Tallow fatty acid | 1500 | 210 | 19.8 | 1 | 0.73 |

Example 13
Production of the catalyst (0.5% Pd/C)

1,500 g of GAC 30 active carbon granules with a particle size of 1.3 to 3 mm (apparent density 0.49 kg/l; pH value 8.3; BET surface 1,140 m$^2$/g and Hg pore volume 0.32 ml/g) were introduced into a mixing vessel.

269.6 g of Pd salt solution as Na$_2$PdCl$_4$ (corresponding to 7.5 g of Pd) were combined with 1,230 g of H$_2$O and mixed with the carbon granules, followed by washing with 1,000 g of H$_2$O. The catalyst granules were then washed as in Example 11 until substantially free from chloride and subsequently dried at 120° C.

Example 14
Use of the catalyst of Example 13

525 g (corresponding to 1,000 ml) of the catalyst produced in accordance with Example 13 were tested for 17 days in a hydrogenation reactor using a total of 369 l of raw materials. The following raw materials were used:

| Tallow fatty acid | IV = 58.5 | AV = 206.3 |
|---|---|---|
| Bone fatty acid | IV = 60.6 | AV = 205.7 |

The following hydrogenation results were obtained:

| Raw material | Total throughput (l) | Temperature (°C.) | LHSV (l/h) | IV |
|---|---|---|---|---|
| Tallow fatty acid | 24 | 190 | 1 | 0.87 |
| | 48 | 210 | 1 | 0.41 |
| | 87 | 210 | 1 | 0.88 |
| | 169 | 220 | 1 | 0.59 |
| | 240 | 220 | 1 | 0.61 |
| Bone fatty acid | 353 | 220 | 1 | 0.19 |
| | 369 | 220 | 1 | 0.13 |

Example 15
Production of the catalyst 1,500 g of GAC 30 active carbon granules with a particle size of 1.2 to 3.4 mm and an apparent density of 0.51 (pH value 7.8; BET surface 1,190 m$^2$/g; Hg pore volume 0.15 ml/g) were introduced into a mixing vessel.

1,078.4 g of Pd salt solution as Na$_2$PdCl$_4$ (corresponding to 30.0 g of palladium) were combined with 421.6 g of H$_2$O and added to the carbon granules. Another 1,000 g of H$_2$O were then added and, after standing, the product obtained was worked up as described above.

The first filtrate had a pH value of 2.8 and the final washing water a pH value of 4.2.

Example 16
Hydrogenation tests 527 g (corresponding to 1,000 ml) of the catalyst produced in accordance with Example 15 were tested for 55 days in a hydrogenation reactor using a total of 1,172 l of various raw materials, namely:

| Palm kernel oil, ref. (PK) | IV = 17.4 | SV = 244 |
|---|---|---|
| Sunflower oil (SF oil), new | IV = 80.7 | SV = 189 |
| Rapeseed oil, ref. | IV = 112.6 | SV = 192 |
| Separated stearin St20 | IV = 20 | AV = 208.6 |
| Tallow fatty acid (TiFA) | IV = 50 | AV = 206.3 |

The three triglycerides were used first. Of these, the sunflower oil and rapeseed oil were only selectively hydrogenated, i.e. the iodine value was reduced to a certain average value. All the tests were carried out under a hydrogen pressure of 20 bar. The following results were obtained:

| Raw material | Total throughput (l) | T (°C.) | LHSV (l/h) | IV |
|---|---|---|---|---|
| PK oil | 54 | 180 | 1 | 0.28 |
| | 118 | 190 | 1 | 0.38 |
| | 166 | 190 | 1 | 0.57 |
| SF oil, new | 182 | 190 | 1 | 7.3 |
| | 200 | 200 | 0.5 | 2.1 |
| | 216 | 150 | 1.0 | 27.3 |
| | 232 | 150 | 1.0 | 35.6 |
| | 304 | 135 | 1.0 | 56.1 |
| Rapeseed oil, ref. | 337 | 135 | 1.0 | 83.4 |
| | 378 | 150 | 1.0 | 74.4 |
| | 402 | 165 | 1.0 | 65.8 |
| | 425 | 190 | 1.0 | 48.8 |
| | 519 | 230 | 0.5 | 6.5 |
| St20 | 549 | 200 | 1.0 | 0.1 |
| | 800 | 200 | 1.0 | 0.1 |
| TiFA | 845 | 200 | 1.0 | 0.1 |
| | 1084 | 200 | 1.0 | 0.1 |

Example 17
Production of the catalyst (2% Pd/C)

716.2 g of active carbon (Carbotech A35/2, 1 mm extrudate with an apparent density of 0.36 kg/l, a BET surface of 892 mm$^2$/g and an Hg pore volume of 0.74 ml/g) were introduced into a mixing vessel and mixed while stirring with 514.7 g of a solution of Na$_2$PdCl$_4$ (corresponding to 14.3 g of palladium) and 200 g of water.

Another 1,000 g of water were then added and, after standing for 1 hour, the mixture was filtered as described above. The first filtrate had a pH value of 1.6 while the final washing water had a pH value of 3.05. The moist catalyst substantially free from chloride was dried at 120° C. and activity-tested in a hydrogenation reactor.

Example 18

Use of the catalyst of Example 17

355 g (corresponding to 1,000 ml) of the catalyst used in accordance with Example 17 were activity-tested for 18 days in a 1 liter hydrogenation reactor using a total of 389 l of raw materials, namely:

| Tallow fatty acid methyl ester | IV = 50.2 | SV = 199.5 |
| Tallow fatty acid | IV = 50 | AV = 206.3 |

The following results were obtained:

| Raw material | Total throughput (l) | T (°C.) | LHSV (l/h) | IV |
|---|---|---|---|---|
| Tallow fatty acid methyl ester | 38 | 170° C. | 1 | 0.07 |
| | 86 | 170° C. | 1 | 0.06 |
| | 171 | 170° C. | 2 | 0.48 |
| Tallow fatty acid | 197 | 190° C. | 1 | 0.26 |
| | 256 | 190° C. | 1 | 0.21 |
| | 328 | 200° C. | 1 | 0.21 |
| | 389 | 200° C. | 1 | 0.22 |

| List of Reference Numerals | |
|---|---|
| 1 | Fatty acid |
| 2 | Receiver |
| 3 | Heater |
| 4 | Reactor |
| 5 | High-pressure separator |
| 6 | Receiver |
| 7 | Recycle gas compressor |
| 8 | Fresh hydrogen |

We claim:

1. In a process for the production of a shell catalyst containing 0.3 to 5% by weight, based on the weight of the dried catalyst, of palladium on an active carbon support by impregnating the support with an aqueous acidic palladium salt solution, precipitation of palladium and reduction of the palladium, the improvement which comprises: impregnating, a dry, alkaline, activated carbon having a pH value of at least 8, with the palladium salt solution, in the absence of an oxidizing agent, and separating the carbon from the supernatant liquid after a pH of the supernatant liquid has increased from a pH below 1 to a pH of at least 1 whereby an outer shell comprising palladium is formed on the active carbon.

2. The process of claim 1 wherein the carbon is separated from the supernatant liquid after the pH of the supernatant liquid has increased to a pH of at least 1.6.

3. The process of claim 1 wherein the carbon is separated from the supernatant liquid after the pH of the supernatant liquid has increased to a pH of at least 3.

4. The process of claim 1 wherein the carbon is separated from the supernatant liquid after the pH of the supernatant liquid has increased to a pH of at least 4.

5. The process of claim 1 wherein the active carbon is agitated during impregnation with the palladium salt solution.

* * * * *